(12) United States Patent
Hirahara et al.

(10) Patent No.: US 6,322,924 B1
(45) Date of Patent: Nov. 27, 2001

(54) PREPARATION OF CROSSLINKED SOLID POLYMER ELECTROLYTE

(75) Inventors: Kazuhiro Hirahara; Toru Nakanishi, both of Ibaraki-ken (JP)

(73) Assignee: Shin-Etsu Chemical Co., Ltd., Tokyo (JP)

(*) Notice: Subject to any disclaimer, the term of this patent is extended or adjusted under 35 U.S.C. 154(b) by 0 days.

(21) Appl. No.: 09/493,278

(22) Filed: Jan. 28, 2000

(30) Foreign Application Priority Data

Jan. 29, 1999 (JP) .................................................. 11-021405

(51) Int. Cl.[7] ...................................................... H01M 6/18
(52) U.S. Cl. ......................... 429/188; 429/304; 429/306; 429/309; 429/313; 252/62.2
(58) Field of Search .................................... 429/188, 313, 429/304, 306, 309; 252/62.2

(56) References Cited

U.S. PATENT DOCUMENTS

| 5,091,274 | * | 2/1992 | Hsuie ................................. 429/192 |
| 5,112,512 | * | 5/1992 | Nakamura ........................... 252/62.2 |
| 5,173,205 | * | 12/1992 | Marchese ........................... 252/62.2 |
| 5,294,501 | * | 3/1994 | Chaloner-Gill ..................... 429/192 |
| 5,362,493 | * | 11/1994 | Skotheim ............................ 429/194 |
| 5,965,299 | * | 10/1999 | Khan .................................... 429/313 |

FOREIGN PATENT DOCUMENTS

| A-3188151 | 8/1991 | (JP) . |
| B2-5 51612 | 8/1993 | (JP) . |
| B2-5 51632 | 8/1993 | (JP) . |
| B2-5 74195 | 10/1993 | (JP) . |
| A-10208545 | 8/1998 | (JP) . |
| A-10223042 | 8/1998 | (JP) . |
| A-10237143 | 9/1998 | (JP) . |
| A-10245427 | 9/1998 | (JP) . |

OTHER PUBLICATIONS

Watanabe et al., Solid State Ionics 79, 1995, pp. 306–312.
Kohjiya et al., Second International Syjmposium on Polymer Electrolytes, 1990, pp. 187–196.
Se et al., Makromol. Chem., Macromol. Symp. 25, 1989, pp. 249–261.
Hirahara et al., Reactive Polymers, 1998, 169–182.
Se et al., Polym. Chem., vol. 36, 1998, pp. 3021–3034.
English abstract of JP–A–2–60925, Teruo et al., Mar. 1, 1990.
English abstract of JP–A–2–229826, Teruo et al., Sep. 12, 1990.
English abstract of JP–A–2–230667, Osamu et al., Sep. 13, 1990.

* cited by examiner

Primary Examiner—Gabrielle Brouillette
Assistant Examiner—Mark Ruthkosky
(74) Attorney, Agent, or Firm—Birch, Stewart, Kolasch & Birch

(57) ABSTRACT

A crosslinked solid polymer electrolyte is prepared by adding a reactive polyalkylene oxide and an inorganic lithium salt to a block-graft copolymer comprising first and second block chains, and subjecting the reactive polyalkylene oxide to crosslinking reaction. The crosslinked solid polymer electrolyte has a high ionic conductivity and can be readily formed into a tough film and is thus suited for use in large-size secondary batteries.

5 Claims, No Drawings

PREPARATION OF CROSSLINKED SOLID POLYMER ELECTROLYTE

This invention relates to a process for preparing a crosslinked solid polymer electrolyte (SPE) suitable for use in primary and secondary batteries.

BACKGROUND OF THE INVENTION

Research and development works have long been made on solid electrolytes. Well known in the art are inorganic materials, for example, β-alumina, $Li_2TiO_3$, $RbAg_4I_5$, silver iodide, and phospho-tungstate. However, inorganic materials have many drawbacks including (1) a high specific gravity, (2) difficulty to form to various shapes, (3) difficulty to form a flexible thin film, and (4) low ionic conductivity at room temperature. These drawbacks must be overcome before the inorganic materials can be used in practice.

In the recent years, organic materials drew attention as a substitute capable of overcoming the above-mentioned drawbacks. Such organic material are commonly formulated as solid polymer electrolytes (SPE) comprising a polymer serving as a matrix such as a polyalkylene oxide, silicone rubber, fluoro-resin or polyphosphazene and an electrolyte serving as a carrier such as $LiClO_4$ or $LiBF_4$ admixed and dissolved therein. As compared with the inorganic materials, these SPE's are lightweight, flexible and easy to form or work into film. For these years, active research and development efforts have been made to formulate more practical SPE while maintaining these advantages.

The applied field of SPE is generally classified into
(1) commercial small-size secondary batteries with the features of room temperature operation and low output and
(2) large-size secondary batteries with the features of high-temperature operation and high output. The small-sized secondary batteries (1) use as a separator a gel SPE in which a low-boiling aprotic organic electrolytic solution is absorbed and carried by a polymer for improving ionic conduction. Partially because their battery construction is substantially the same as lithium ion batteries, they have already reached a practically acceptable level as a low-output, compact, ultra-thin battery.

The class (2) includes lithium polymer batteries which are contemplated to use lithium metal as the negative electrode and expected to find application in electric automobiles and overnight power storage systems in the near future. In these large-size secondary batteries, however, a substantial quantity of heat is generated upon charging/discharging cycles and the battery itself is considerably increased in temperature. If gel type SPE is used as in (1), an envelope can of the battery can be bulged due to the vapor pressure of the electrolytic solution, and even the danger of explosion at worst is pointed out. To solve these problems, large-size secondary batteries of the high-temperature operation type were proposed in which a dry SPE system is heated to a temperature of 60 to 80° C. for providing an increased ionic conductivity. On these batteries, research and development efforts have long been made mainly in US and Europe. However, there is not available at present the SPE which is fully safe, has improved film strength and generates no vapor pressure within the battery system even when exposed to such a high-temperature region.

Research reports regarding (2) include M. Watanabe et al., Solid State Ionics, 79 (1995), 306–312, and S. Kohjiya et al., Second International Symposium on Polymer Electrolytes, ed. by B. Scrosati, Elsevier, Appl. Sci., London (1990), pp. 187–196. Despite an ionic conductivity reaching the order of $10^{-4}$ S/cm near room temperature, these SPE's are unacceptable in practice because of the lack of film strength.

In Japanese Patent No. 1,842,047 (Japanese Patent Publication No. 5-51612), Makromol. Chem. Macromol. Symp., 25 (1989), 249, Reactive and Functional Polymers, 37 (1998), 169–182, and J. Polym. Sci., Part A: Polym. Chem., 36 (1998), 3021–3034, the same assignee as the present invention proposed how to synthesize a block-graft copolymer, which becomes a model leading to the present invention.

In order to utilize the block-graft copolymer as an ion conducting solid, Japanese Patent No. 1,842,048 (Japanese Patent Publication No. 5-51632) proposes as SPE a composition comprising a block-graft copolymer in admixture with an inorganic salt containing at least one element selected from among Li, Na, K, Cs, Ag, Cu and Mg in an amount of 0.05 to 80 mol % based on the alkylene oxide units in the copolymer. JP-B 5-74195 discloses a Li battery in which a composite of a similar block-graft copolymer with a Li ion salt is incorporated as the electrolyte. However, these proposals failed to reach the practically acceptable level because of low ionic conduction at room temperature.

For improving the ionic conductivity at room temperature, the assignee proposed in JP-A 3-188151 a block-graft copolymer composition comprising in admixture, a composite of a block-graft copolymer with an inorganic ion salt and a polyalkylene oxide. It was found that if a large amount of polyalkylene oxide is added to the block-graft copolymer, the polystyrene domain serving to maintain mechanical strength is partially dissolved so that the film is weakened.

To solve the newly derived problem, the assignee developed a block-graft copolymer which is insoluble in various polyalkylene oxides and has silyl-substituted polystyrene as block chains, and proposed in JP-A 10-237143 a block-graft copolymer composition comprising the block-graft copolymer and a polyalkylene oxide. JP-A 10-208545 of the assignee discloses a crosslinked SPE in which polystyrene domain has been chemically crosslinked with a crosslinking agent to form a network structure, in order to protect the polystyrene domain from being dissolved in the polyalkylene oxide added in a large amount to the block-graft copolymer. Additionally, JP-A 10-223042 and 10-245427 of the assignee disclose a self-crosslinking block-graft copolymer whose polystyrene domain can be readily crosslinked merely by irradiating high-energy radiation without a need for a crosslinking agent.

The series of research works completed an SPE which is significantly improved in ionic conductivity and film strength even at high temperatures of 60 to 80° C., with which high-temperature operating batteries at the practically acceptable level can be manufactured on a mass scale.

A particular type of polyalkylene oxide added to the block-graft copolymer exerts some vapor pressure in the temperature region of 60 to 80° C. Also, when the SPE is applied to large-size batteries of the high-temperature operation type, the temperature often exceeds the contemplated temperature region by several tens of centigrade under certain operating conditions. There is a demand to have a battery which is safer because of a wider temperature margin on the high temperature side.

SUMMARY OF THE INVENTION

An object of the invention is to provide a process for preparing a crosslinked solid polymer electrolyte by adding a reactive polyalkylene oxide to a block-graft copolymer and crosslinking the polyalkylene oxide to a moderate extent so as not to affect the ion transporting capability, whereby the resulting crosslinked solid polymer electrolyte does produce no vapor pressure even at high temperatures above 100° C., and has improved ionic conductivity and film strength as well as good moldability and workability.

The invention provides a process for preparing a crosslinked solid polymer electrolyte comprising the steps of furnishing a block-graft copolymer comprising a block chain A of recurring units represented by the general formula (I) and at least one of a block chain B of recurring units represented by the general formula (II) and a block chain C of recurring units represented by the general formula (III), adding a reactive polyalkylene oxide represented by the general formula (IV) and an inorganic lithium salt thereto, and subjecting the reactive polyalkylene oxide to crosslinking reaction.

In one preferred embodiment, a reactive polyalkylene oxide represented by the general formula (IV), preferably a mixture of a monofunctional polyalkylene oxide and a difunctional polyalkylene oxide, and an inorganic lithium salt are added to a block-graft copolymer comprising the block chain A of at least one type consisting of recurring units represented by the general formula (I) and having a degree of polymerization of at least 10 and the block chain B of at least one type consisting of recurring units represented by the general formula (II) and having a degree of polymerization of at least 300, wherein the constitutional ratio of block chain A to block chain B ranges from 1:30 to 30:1 in terms of the degree of polymerization, the block-graft copolymer having a degree of polymerization of at least 310, whereupon the reactive polyalkylene oxide is subjected to crosslinking reaction, preferably by irradiating electron beams.

In an alternative preferred embodiment, a reactive polyalkylene oxide represented by the general formula (IV), preferably a mixture of a monofunctional polyalkylene oxide and a difunctional polyalkylene oxide, and an inorganic lithium salt are added to a block-graft copolymer comprising the block chain A of at least one type consisting of recurring units represented by the general formula (I) and having a degree of polymerization of at least 10 and the block chain C of at least one type consisting of recurring units represented by the general formula (III) and having a degree of polymerization of at least 200, wherein the constitutional ratio of block chain A to block chain C ranges from 1:20 to 20:1 in terms of the degree of polymerization, the block-graft copolymer having a degree of polymerization of at least 210, whereupon the reactive polyalkylene oxide is subjected to crosslinking reaction, preferably by irradiating electron beams.

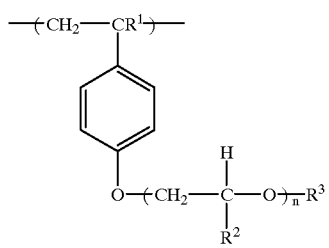

Herein $R^1$ is hydrogen, methyl or ethyl, $R^2$ is hydrogen or methyl, $R^3$ is an alkyl, aryl, acyl, silyl or cyanoalkyl group, and n is an integer of 1 to 100. The graft chain in the formula (I) represented by the following formula (I-a):

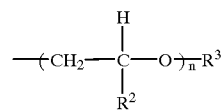

has a number average molecular weight of 45 to 4,400.

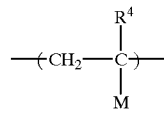

Herein $R^4$ is hydrogen, methyl or ethyl, and M is —CH=CH$_2$, —C(CH$_3$)=CH$_2$, —COOCH$_3$, —COOC$_2$H$_5$, phenyl or substituted phenyl.

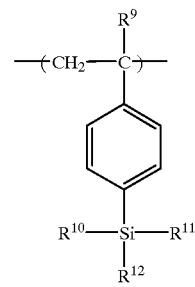

Herein $R^9$ is hydrogen, methyl or ethyl, and $R^{10}$ to $R^{12}$ are methyl or ethyl.

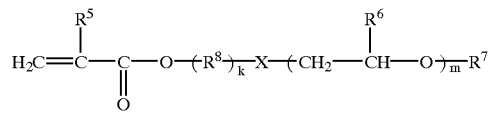

Herein $R^5$ and $R^6$ each are hydrogen or methyl, $R^7$ is H$_2$C=CHCO—, H$_2$C=C(CH$_3$)CO—, vinyl, allyl, epoxide, alkyl of up to 25 carbon atoms, phenyl or substituted phenyl, and $R^8$ is ethylene oxide or tetramethylene oxide. The letters k and m are each an integer of 0 to 25, with the proviso that k and m are not equal to 0 at the same time, and when one of k and m is 0, the other is an integer of at least 1. X is —PhC(CH$_3$)$_2$PhO— or a valence bond, and Ph is a phenylene group.

According to the invention, a reactive polyalkylene oxide is added to a block-graft copolymer and subjected to crosslinking reaction. As a result, a film having improved thermal stability is obtainable in which the trunk molecule forms a pseudo-crosslinked structure to enhance the mechanical strength of the film, the polyalkylene oxide component crosslinked with the graft component forms a continuous phase to provide paths for metal ions, and the crosslinked polyalkylene oxide produces no vapor pressure.

When a monofunctional or difunctional acrylate, methacrylate, allyl or epoxide represented by the general formula (IV) is used as the reactive polyalkylene oxide, the crosslinking reaction of the reactive polyalkylene oxide can be completed by irradiating electron beams, for example.

The process ensures that a crosslinked solid polymer electrolyte which does produce no vapor pressure even at high temperatures and has a high ionic conductivity and a high film strength is produced in a simple manner. For the purpose of producing a polymer electrolyte which takes advantage of block-graft copolymers, maintains an improved mechanical strength and a high ionic conductivity even at high temperatures and is safe, it is effective to perform moderate crosslinking on a polyalkylene oxide added to a block-graft copolymer to thereby form a three-dimensional network structure. The present invention is predicated on this finding.

DESCRIPTION OF THE PREFERRED EMBODIMENTS

The block-graft copolymer from which the crosslinked solid polymer electrolyte is prepared according to the invention is comprised of a block chain A consisting of recurring units represented by the general formula (I) and a block chain B consisting of recurring units represented by the general formula (II) and/or a block chain C consisting of recurring units represented by the general formula (III). The preferred block-graft copolymer is basically the same as disclosed in the above-referred Japanese Patent No. 1842047 and JP-A 10-237143. Illustratively, preferred is a block-graft copolymer comprising the block chain A of at least one type consisting of recurring units represented by the general formula (I) and having a degree of polymerization of at least 10 and the block chain B of at least one type consisting of recurring units represented by the general formula (II) and having a degree of polymerization of at least 300, wherein the constitutional ratio of block chain A to block chain B ranges from 1:30 to 30:1 in terms of the degree of polymerization, the block-graft copolymer having a degree of polymerization of at least 310. An alternative preferred block-graft copolymer is comprised of the block chain A of at least one type consisting of recurring units represented by the general formula (I) and having a degree of polymerization of at least 10 and the block chain C of at least one type consisting of recurring units represented by the general formula (III) and having a degree of polymerization of at least 200, wherein the constitutional ratio of block chain A to block chain C ranges from 1:20 to 20:1 in terms of the degree of polymerization, the block-graft copolymer having a degree of polymerization of at least 210.

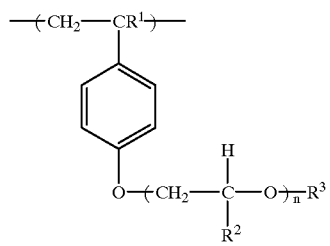

(I)

Herein $R^1$ is hydrogen, methyl or ethyl, $R^2$ is hydrogen or methyl, $R^3$ is an alkyl, aryl, acyl, silyl or cyanoalkyl group, and n is an integer of 1 to 100. The graft chain in the formula (I) represented by the following formula (I-a):

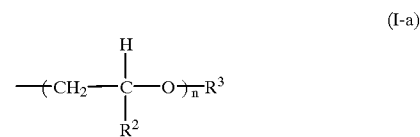

(I-a)

has a number average molecular weight of 45 to 4,400.

Preferably the alkyl groups represented by $R^3$ are those of 1 to 10 carbon atoms, especially 1 to 2 carbon atoms. The preferred aryl groups are those of 6 to 10 carbon atoms, especially 6 to 8 carbon atoms, with phenyl being most preferred. The preferred acyl groups are those of 1 to 9 carbon atoms, especially 1 to 2 carbon atoms, for example, formyl and acetyl. The preferred silyl groups are represented by —$SiR_3$ wherein R may be the same or different and represents monovalent hydrocarbon groups of 3 to 15 carbon atoms, especially 3 to 6 carbon atoms, preferably alkyl groups. The preferred cyanoalkyl groups are alkyl groups of 2 to 10 carbon atoms, especially 2 to 4 carbon atoms, wherein at least one hydrogen atom is replaced by a cyano group, for example, cyanoethyl and cyanopropyl.

(II)

Herein $R^4$ is hydrogen, methyl or ethyl, and M is a group represented by —$CH=CH_2$, —$C(CH_3)=CH_2$, —$COOCH_3$, or —$COOC_2H_5$, or a substituted or unsubstituted phenyl group. The substituted phenyl group represented by $R^4$ is exemplified by tolyl and xylyl groups.

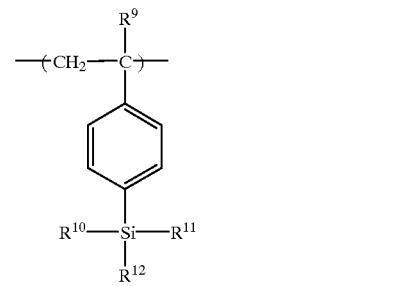

(III)

Herein $R^9$ is hydrogen, methyl or ethyl, and $R^{10}$ to $R^{12}$ are methyl or ethyl.

In the block-graft copolymer, the block chain A consisting of recurring units of the same or different types represented by formula (I) and the block chain B consisting of recurring units of the same or different types represented by formula (II) and/or the block chain C consisting of recurring units of the same or different types represented by formula (III) are arranged in an arbitrary sequence, for example, AB, AC, BAB, BAB', CAC, C'AC, BAC, BAB'AB or C'ABAC. Preferred sequences are BAB, BAB', B'ABAB', BAB'AB, CAC, CAC', C'ACAC', and CAC'AC, with the BAB, BAB', CAC and CAC' sequences being especially preferred. It is noted that in these exemplary sequences, B and B' or C and C' indicate different block chains which commonly fall in the range of block chain B or C, but are different in that $R^4$ and M therein differ or the degree of polymerization differs.

The block chains A, B, and C in the polymer preferably have a degree of polymerization of at least 10, at least 300, and at least 200, respectively. The constitutional ratio of block chain A to block chain B preferably ranges from 1:30 to 30:1 in terms of the degree of polymerization. Similarly the constitutional ratio of block chain A to block chain C preferably ranges from 1:20 to 20:1. The block-graft copolymer resulting from copolymerization preferably has a degree of polymerization of 310 to 50,000 for the sequence of block chains A and B and 210 to 50,000 for the sequence of block chains A and C.

While the block chain A in the polymer contributes to the function of a polymeric electrolyte, a degree of polymerization of less than 10 may not provide the micro-phase separated structure characterizing the inventive polymer wherein the ion conducting domain forms a continuous phase. While the block chain B contributes to the maintenance of mechanical strength, a degree of polymerization of less than 300 may lead to a lowering of mechanical strength because of insufficient intertwinement between polymer molecules. Namely, if the constitutional ratio of block chain A to block chain B is less than 1:30, there may be available less graft components, making it difficult to insure the function of a polymeric electrolyte. If the same ratio is more than 30:1, the block chain serving as a trunk component may be reduced, failing to maintain mechanical strength. The block chain C whose polymer has a higher glass transition temperature (Tg) than the block chain B and is not dissolved in or swollen with ordinary polyalkylene oxides can maintain mechanical strength even at an exceptionally low degree of polymerization. For this reason, it is preferred that the block chain C have a degree of polymerization of at least 200, the constitutional ratio of block chain A to block chain C range from 1:20 to 20:1 in terms of the degree of polymerization, and copolymers resulting from copolymerization of block chain C have a degree of polymerization of at least 210.

The crosslinked solid polymer electrolyte is prepared by adding a reactive polyalkylene oxide represented by the general formula (IV) and an inorganic lithium salt to the block-graft copolymer and effecting crosslinking reaction on the reactive polyalkylene oxide.

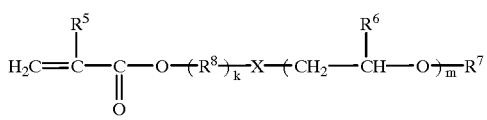

(IV)

Herein $R^5$ and $R^6$ each are hydrogen or methyl, $R^7$ is $H_2C=CHCO-$, $H_2C=C(CH_3)CO-$, vinyl, allyl, epoxide, alkyl of up to 25 carbon atoms, phenyl or substituted phenyl, and $R^8$ is ethylene oxide or tetramethylene oxide. The letters k and m are each an integer of 0 to 25, with the proviso that k and m are not equal to 0 at the same time, that is, when one of k and m is 0, the other is an integer of at least 1. X is a valence bond or $-PhC(CH_3)_2PhO-$ wherein Ph is phenylene.

The epoxide represented by $R^7$ is exemplified by the following formulae:

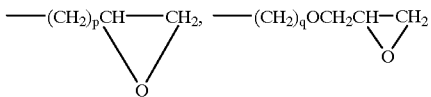

wherein p is an integer of 1 to 25 and q is an integer of 1 to 25. The substituted phenyl group represented by $R^7$ is exemplified by tolyl and xylyl groups.

As the reactive polyalkylene oxide added to the block-graft copolymer, acrylate derivatives, methacrylate derivatives and vinyl derivatives of polyalkylene glycols are useful, with those derivatives containing no active hydrogen or halogen in their structure being preferred. Illustrative examples include
methoxyethylene glycol mono(meth)acrylate,
methoxypolyethylene glycol mono(meth)acrylate,
octoxypolyethylene glycol-block-polypropylene glycol mono(meth)acrylate,
lauroxypolyethylene glycol mono(meth)acrylate,
stearoxypolyethylene glycol mono(meth)acrylate,
allyloxypolyethylene glycol mono(meth)acrylate,
nonylphenoxypolyethylene glycol mono(meth)acrylate,
nonylphenoxypolypropylene glycol mono(meth)acrylate,
nonylphenoxypoly(ethylene glycol-propylene glycol)mono (meth)acrylate,
ethylene glycol di(meth)acrylate,
polyethylene glycol di(meth)acrylate,
propylene glycol di(meth)acrylate,
polypropylene glycol di(meth)acrylate,
polyethylene glycol-block-polypropylene glycol-block-polyethylene glycol di(meth)acrylate,
polytetramethylene glycol di(meth)acrylate,
poly(ethylene glycol-tetramethylene glycol)di(meth)acrylate, and
poly(propylene glycol-tetramethylene glycol)di(meth)acrylate.

Also included are those in which block chains (k) and (m) are bonded by bisphenol A, such as ethylene oxide-modified bisphenol A di(meth)acrylate, ethylene oxide-propylene oxide-modified bisphenol A di(meth)acrylate, propylene oxide-tetramethylene oxide-modified bisphenol A di(meth)acrylate, and ethylene oxide-block-propylene oxide-modified bisphenol A di(meth)acrylate.

In the practice of the invention, a mixture of monofunctional and difunctional polyalkylene oxides is often used. The use of a mixture of polyalkylene oxides of at least two types having the same number of functional groups is also effective. Further, though not illustrated herein, the use of tri- or poly-functional polyalkylene oxide leading to a higher crosslink density is effective when it is desirable to enhance the film strength at some sacrifice of ionic conductivity.

An appropriate amount of the reactive polyalkylene oxide added is at least 5% by weight, more preferably 50 to 600% by weight, based on the block-graft copolymer. The mixing ratio of monofunctional to difunctional polyalkylene oxide is preferably from 5:95 to 95:5, and more preferably from 10:90 to 70:30, by weight. No particular limit is imposed on the mixing ratio of reactive polyalkylene oxides of different types having the same number of functional groups.

The reactive polyalkylene oxide is added to the block-graft copolymer by various procedures. For example, the reactive polyalkylene oxide is added to the block-graft copolymer and mechanically mixed therewith at room temperature or elevated temperature. Alternatively, the reactive polyalkylene oxide and the block-graft copolymer are dissolved in a common solvent, and the solution is cast into a film. Since the block-graft copolymer used herein has a good function as a polymeric compatibilizing agent, the alkylene oxide automatically collects in the graft phase to form a micro-phase separated structure, independent of how it is added. Therefore, the addition procedure is arbitrary and not critical.

The type of the inorganic lithium salt to be added to the block-graft copolymer is preferably at least one compound selected from among $LiClO_4$, $LiBF_4$, $LiPF_6$, $LiAsF_6$, $LiCF_3SO_3$, and $LiN(CF_3SO_2)_2$. An appropriate amount of the inorganic lithium salt added is 0.01 to 80 mol %, more preferably 0.02 to 15 mol %, based on the total molar number of graft chains in the block-graft copolymer and alkylene oxide units in the reactive polyalkylene oxide added. Like the polyalkylene oxide, it is not critical how to add the inorganic lithium salt.

Exemplary procedures for effecting crosslinking reaction on the reactive polyalkylene oxide added to the block-graft copolymer include a heat crosslinking procedure of applying heat to induce crosslinking, a UV exposure procedure of irradiating UV radiation to induce crosslinking, and an electron beam procedure of irradiating electron beams to induce crosslinking. In the heat crosslinking procedure, 2,2'-azobis(isobutyronitrile) or an organic peroxide (e.g., benzoyl peroxide or peroxymethyl ethyl ketone) is previously added as a thermal polymerization initiator to the system, which is formed into a film and then heated at a temperature above 85° C. for a predetermined time. In the UV exposure procedure, a photo-polymerization initiator such as 2,2-dimethoxy-2-phenylacetophene, benzyl methyl ketal, trimethylsilyl-benzophenone, 2-methylbenzoin, 4-methoxybenzophenone, benzoin methyl ether or anthraquinone is added to the system, which is formed into a film and then irradiated with UV, for example, for at least 3 minutes under a high-pressure mercury lamp of 500 W. In the electron beam procedure, after film formation, electron beams are irradiated in a dose of about 5 to 100 Mrad by an electron beam emitting means. The heat crosslinking and UV exposure procedures require the use of radical releasing agents or polymerization initiators, which makes the reaction system more complex and sometimes can adversely affect the transportation of lithium ions. For this reason, the invention favors the crosslinking procedure using electron beams or radiation having the advantages of high energy level, ease of control and eliminated use of radical releasing agents. A series of tests were carried out by operating an electron beam emitting system CB250/30/180L by Iwasaki Electric K.K. at an accelerating voltage of 200 kV and a dose of 5 to 100 Mrad, finding that the electron beam procedure is very effective for crosslinking.

The solid polymer electrolyte of the invention is comprised of the block-graft copolymer having the advantages that (1) it has a definite micro-phase separated structure, (2) the trunk molecule having a high mechanical strength forms a pseudo-crosslinked structure for playing the role of structural retention and enhancing the material strength, (3) the graft component even of a relatively low molecular weight forms a continuous phase to provide paths for metal ions, (4) the graft component has the function of a compatibilizing agent so that a large amount of polyalkylene oxide is tightly carried within the film, and (5) it has improved thermal stability and high safety at high temperatures because of the absence of volatile components within the system.

Accordingly, the solid polymer electrolyte of the invention is advantageously applied to lithium polymer secondary batteries capable of operation at high temperatures for use in electric automobiles and overnight power storage systems which are expected to reach the practically acceptable level in the near future. The electrolyte is quite advantageous for reducing the weight of batteries and forming thin films, and ensures the production of highly safe batteries.

In addition to the secondary batteries, the crosslinking type polymer electrolyte of the invention find use in a variety of solid electrochemical devices such as primary batteries, capacitors, electrochromic displays and sensors.

EXAMPLE

Examples of the invention are given below by way of illustration and not by way of limitation.

The block copolymer is expressed by connecting respective components via -b-. For example, a ternary block copolymer consisting of polystyrene, poly-p-hydroxystyrene and polystyrene is expressed as poly(styrene-b-p-hydroxystyrene-b-styrene). A graft chain is expressed by connecting it through -g-.

Example 1

Electron beam crosslinking I of a block-graft copolymer film with a reactive polyalkylene oxide and an inorganic lithium salt added.

The molecular structure of the block-graft copolymer used in Example 1, the constitutional ratio of respective block chains therein, and the composition of graft chain are shown below.

Block-graft Copolymer Sample No. T-1

(1) Molecular structure poly[styrene-b-(p-hydroxystyrene-g-ethylene oxide)-b-styrene]

(2) Block chain A of the general formula (I)

$R^1$=hydrogen, $R^2$=hydrogen, $R^3$=methyl, degree of polymerization=250

(3) Block chain B of the general formula (II)

$R^4$=hydrogen, M=phenyl, degree of polymerization=500

(4) Sequence of block chains

BAB (tri-block copolymer)

(5) Constitutional ratio of block chains (degree-of-polymerization ratio)

B:A:B=500:250:500=2:1:2 (2B:A=4:1)

(6) Graft chain of the general formula (I-a)

$R^2$=hydrogen, $R^3$=methyl, degree of polymerization (n)= 16, number average molecular weight (Mn)=700

In 60 ml of dimethyl carbonate were dissolved 5.0 g of the block-graft copolymer identified above (Sample No. T-1), 2.0 g of methoxypolyethylene glycol monomethacrylate (Mn=276), 1.0 g of polyethylene glycol diacrylate (Mn=214), and 0.5 g of $LiClO_4$. The solution was cast on a Teflon-coated dish. The sample was allowed to stand in an argon stream at room temperature for about 20 hours for evaporating off an excess of the solvent and then heat dried at 80° C. for two hours, yielding a film of 20 μm thick. The film was irradiated with electron beams at an accelerating voltage of 200 kV to a dose of 10 Mrad. The sample film was thermally analyzed by means of a differential thermobalance DSC-20 (by Seiko Electronic Industry K.K.). During the thermal analysis, a weight loss of less than 1% which seemed attributable to dimethyl carbonate appeared at about 90° C., but no weight change was subsequently observed up to 250° C. It was ascertained that the reactive polyalkylene oxide added to the block-graft copolymer was completely crosslinked, did not volatilize even at high temperatures of 100 to 250° C., did produce no vapor pressure, and was retained within the graft phase in a stable manner.

Example 2

Electron beam crosslinking II of a block-graft copolymer film with a reactive polyalkylene oxide and an inorganic lithium salt added.

Sample films prepared from the same formulation as in Example 1 were irradiated with electron beams at an accelerating voltage of 200 kV to a dose of 1 to 3 Mrad. On thermal analysis of these films, an abrupt weight loss was observed from about 150° C. On the other hand, similar sample films irradiated with electron beams to a dose of 5 to 100 Mrad were kept stable on thermal analysis up to 250° C., with no weight loss except for that of the solvent being observed. For this reason, the dose value of 10 Mrad that enables the reactive polyalkylene oxide added to be fully crosslinked and prohibits the generation of a vapor pressure at elevated temperatures of 100 to 250° C. was used as a standard dose in the ensuing Examples.

Example 3

A sample film was prepared from the same formulation as in Example 1, irradiated with electron beams at an accelerating voltage of 200 kV to a dose of 10 Mrad, and dried in vacuum at 100° C. for 20 hours. There was obtained a crosslinked solid polymer electrolyte film of 20 Mm thick. The film was tough despite the inclusion of a large amount of polyalkylene oxide. It had a storage elastic modulus of $8.1 \times 10^6$ Pa at 30° C. and at least $4.3 \times 10^6$ Pa even at 80° C., as measured by a dynamic viscoelasticity meter RSA-II (Rheometric Inc.). When the electrolyte film was compressed under a pressure of 100 kg/cm$^2$ at 20° C., the internally incorporated polyalkylene oxide did not exude at all.

A disk of 10 mm in diameter was cut out of the film. The disk at opposed surfaces was sandwiched between a pair of lithium metal plates serving as electrodes. Using an ac impedance meter (multi-frequency LCRX meter 4192A by Yokokawa Hewlett Packard K.K.) operating over the frequency range of 5 Hz to 5 MHz, an ionic conductivity was determined by the complex impedance method. The film had an ionic conductivity of $0.8 \times 10^{-3}$ S/cm at 80° C.

Examples 4 to 9

The molecular structure of the block-graft copolymers (Sample Nos. T-2, T-3, T-4 and S-1) used in Examples 4 to 9, the constitutional ratio of respective block chains therein, and the composition of graft chain are shown below. Crosslinked solid polymer electrolyte films were prepared by adding different reactive polyalkylene oxides and inorganic lithium salts to the block-graft copolymers, and irradiating electron beams for crosslinking. The films were evaluated as in Example 3, with the results shown in Table 1.

Sample No. T-2
  (1) Molecular structure
    poly[styrene-b-(p-hydroxystyrene-g-ethylene oxide)-b-styrene]
  (2) Block chain A of the general formula (I)
    $R^1$=hydrogen, $R^2$=hydrogen, $R^3$=methyl, degree of polymerization=250
  (3) Block chain B of the general formula (II)
    $R^4$=hydrogen, M=phenyl, degree of polymerization=500
  (4) Sequence of block chains
    BAB (tri-block copolymer)
  (5) Constitutional ratio of block chains (degree-of-polymerization ratio)
    B:A:B=500:250:500=2:1:2 (2B:A=4:1)
  (6) Graft chain of the general formula (I-a)
    $R^2$=hydrogen, $R^3$=methyl, degree of polymerization (n)=28, number average molecular weight (Mn)=1230

Sample No. T-3
  (1) Molecular structure
    poly[styrene-b-(p-hydroxystyrene-g-ethylene oxide)-b-styrene]
  (2) Block chain A of the general formula (I)
    $R^1$=hydrogen, $R^2$=hydrogen, $R^3$=methyl, degree of polymerization=250
  (3) Block chain B of the general formula (II)
    $R^4$=hydrogen, M=phenyl, degree of polymerization=500
  (4) Sequence of block chains
    BAB (tri-block copolymer)
  (5) Constitutional ratio of block chains (degree-of-polymerization ratio)
    B:A:B=500:250:500=2:1:2 (2B:A=4:1)
  (6) Graft chain of the general formula (I-a)
    $R^2$=hydrogen, $R^3$=methyl, degree of polymerization (n)=7, number average molecular weight (Mn)=290

Sample No. T-4
  (1) Molecular structure
    poly[styrene-b-(p-hydroxystyrene-g-ethylene oxide)-b-styrene]
  (2) Block chain A of the general formula (I)
    $R^1$=hydrogen, $R^2$=hydrogen, $R^3$=methyl, degree of polymerization=250
  (3) Block chain B of the general formula (II)
    $R^4$=hydrogen, M=phenyl, degree of polymerization=500
  (4) Sequence of block chains
    BAB (tri-block copolymer)
  (5) Constitutional ratio of block chains (degree-of-polymerization ratio)
    B:A:B=500:250:500=2:1:2 (2B:A=4:1)
  (6) Graft chain of the general formula (I-a)
    $R^2$=hydrogen, $R^3$=methyl, degree of polymerization (n)=9, number average molecular weight (Mn)=390

Sample No. S-1
  (1) Molecular structure
    poly[trimethylsilylstyrene-b-(p-hydroxystyrene-g-ethylene oxide)-b-trimethylsilylstyrene]
  (2) Block chain A of the general formula (I)
    $R^1$=hydrogen, $R^2$=hydrogen, $R^3$=methyl, degree of polymerization=150
  (3) Block chain C of the general formula (III)
    $R^9$=hydrogen, $R^{10}$=methyl, $R^{11}$=methyl, R=methyl, degree of polymerization=300
  (4) Sequence of block chains
    CAC (tri-block copolymer)
  (5) Constitutional ratio of block chains (degree-of-polymerization ratio)
    C:A:C=300:150:300=2:1:2 (2C:A=4:1)
  (6) Graft chain of the general formula (I-a)
    $R^2$=hydrogen, $R^3$=methyl, degree of polymerization (n)=30, number average molecular weight (Mn)=1330

TABLE 1

| | Composition of crosslinked solid polymer electrolyte film | | | | | | Storage | |
|---|---|---|---|---|---|---|---|---|
| | Block-graft copolymer | | Inorganic lithium salt | | Reactive polyalkylene oxide | | Ionic conductivity | elastic modulus |
| | Sample No. | Amount (g) | Type | Amount (g) | Type and composition | Amount (g) | @ 80° C. (× $10^{-3}$ S/cm) | @ 80° C. (× $10^6$ Pa) |
| E4 | T-2 | 5.0 | LiClO$_4$ | 0.7 | A | 2.0 | 1.2 | 2.3 |
| | | | | | B | 2.0 | | |
| E5 | T-2 | 5.0 | LiClO$_4$ | 1.2 | C | 1.5 | 2.5 | 1.5 |
| | | | | | D | 3.0 | | |
| E6 | T-2 | 5.0 | LiCF$_3$SO$_3$ | 1.5 | E | 1.0 | 2.0 | 1.3 |
| | | | | | F | 3.0 | | |
| E7 | T-3 | 10.0 | LiPF$_6$ | 2.0 | G | 1.0 | 2.5 | 1.1 |
| | | | | | H | 3.0 | | |
| | | | | | I | 3.0 | | |
| E8 | T-4 | 8.0 | LiBF$_4$ | 1.0 | J | 0.5 | 2.1 | 2.7 |
| | | | | | K | 4.0 | | |
| E9 | S-1 | 5.0 | LiAsF$_6$ | 0.8 | L | 0.3 | 2.7 | 1.9 |
| | | | | | M | 2.0 | | |

A: methoxypolyethylene glycol monomethacrylate (Mn = 276)
B: polyethylene glycol diacrylate (Mn = 302)
C: methoxypolyethylene glycol monoacrylate (Mn = 466)
D: polypropylene glycol dimethacrylate (Mn = 386)
E: methoxypolyethylene glycol monomethacrylate (Mn = 496)
F: allyloxypolyethylene glycol monomethacrylate (Mn = 214)
G: octoxypolyethylene glycol-polypropylene glycol monomethacrylate (Mn = 898)
H: polypropylene glycol diacrylate (Mn = 302)
I: poly(ethylene glycol-tetramethylene glycol) dimethacrylate (Mn = 600)
J: lauroxypolyethylene glycol monoacrylate (Mn = 400)
K: polypropylene glycol diacrylate (Mn = 518)
L: methoxypolyethylene glycol monoacrylate (Mn = 482)
M: allyloxypolyethylene glycol monoacrylate (Mn = 380)

It is seen from Table 1 that the crosslinked solid polymer electrolytes prepared by the process of the invention produce no vapor pressure even at elevated temperatures above 100° C. despite the inclusion of large amounts of polyalkylene oxide and inorganic lithium salt in the film, and exhibit a high ionic conductivity and a high film strength.

Comparative Example 1

A solid electrolyte film of 100 μm thick was prepared according to the process of U.S. Pat. No. 5,296,318. More particularly, 5.0 g of a VdF/HFP copolymer (Atochem Kyner FLEX 2801), 2.0 g of methoxypolyethylene glycol monomethacrylate (Mn=273), 1.0 g of polyethylene glycol diacrylate (Mn=214), and 0.5 g of LiClO$_4$ were mixed with and dissolved in 50 ml of tetrahydrofuran. The solution was cast on a Teflon-coated dish. The sample was allowed to stand in an argon stream at room temperature for about 20 hours for evaporating off an excess of the solvent and then heat dried at 80° C. for two hours. However, a macro-phase separation occurred since the VdF/HFP copolymer was not compatible with the polyalkylene oxide. There was obtained only a semi-solid film which did not completely solidify.

Comparative Example 2

The semi-solid film obtained in Comparative Example 1 was irradiated with electron beams at an accelerating voltage of 200 kV to a dose of 10 Mrad, yielding a heterogeneous film with the macro-phase separation maintained. Upon irradiation of electron beams to a dose of 50 Mrad or more, the VdF/HFP copolymer underwent degradation, releasing fluorine gas.

According to the process of the invention, there is obtained a crosslinked solid polymer electrolyte which has a high ionic conductivity and an improved ability to be formed or worked into a film having a high strength and is suited for use in large-size secondary batteries.

Japanese Patent Application No. 11-021405 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

What is claimed is:

1. A process for preparing a crosslinked solid polymer electrolyte comprising the steps of furnishing a block-graft copolymer comprising a block chain A consisting of recurring units represented by the general formula (I) and at least one of a block chain B consisting of recurring units represented by the general formula (II) and a block chain C consisting of recurring units represented by the general formula (III), adding a reactive polyalkylene oxide represented by the general formula (IV) and an inorganic lithium salt thereto, and subjecting said reactive polyalkylene oxide to crosslinking reaction,

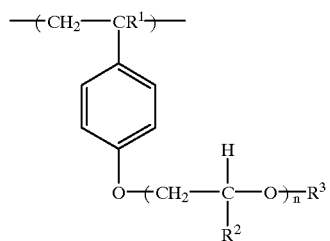
(I)

wherein $R^1$ is hydrogen, methyl or ethyl, $R^2$ is hydrogen or methyl, $R^3$ is an alkyl, aryl, acyl, silyl or cyanoalkyl group, n is an integer of 1 to 100, and the graft chain in the formula (I) represented by the following formula (I-a):

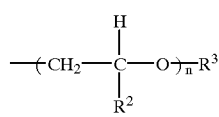
(I-a)

has a number average molecular weight of 45 to 4,400,

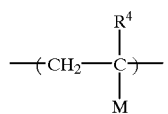
(II)

wherein $R^4$ is hydrogen, methyl or ethyl, and M is —CH=CH$_2$, —C(CH$_3$)=CH$_2$, —COOCH$_3$, —COOC$_2$H, phenyl or substituted phenyl,

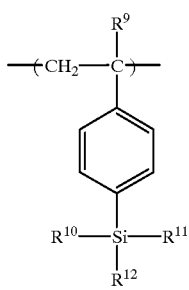
(III)

wherein $R^9$ is hydrogen, methyl or ethyl, and $R^{10}$ to $R^{12}$ are methyl or ethyl,

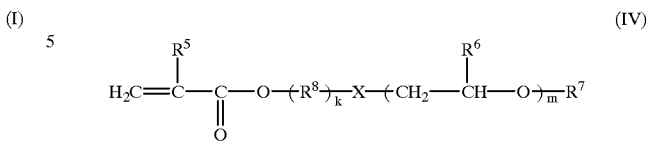
(IV)

wherein $R^5$ and $R^6$ each are hydrogen or methyl, $R^7$ is H$_2$C=CHCO—, H$_2$C=C(CH$_3$)CO—, vinyl, allyl, epoxide, alkyl of up to 25 carbon atoms, phenyl or substituted phenyl, $R^8$ is ethylene oxide or tetramethylene oxide, k and m are each an integer of 0 to 25, with the proviso that k and m are not equal to 0 at the same time, and when one of k and m is 0, the other is an integer of at least 1, X is —PhC(CH$_3$)$_2$PhO— or a valence bond, and Ph is a phenylene group.

2. The process of claim 1 wherein said block-graft copolymer is comprised of the block chain A of at least one type consisting of recurring units represented by the general formula (I) and having a degree of polymerization of at least 10 and the block chain B of at least one type consisting of recurring units represented by the general formula (II) and having a degree of polymerization of at least 300, wherein the constitutional ratio of block chain A to block chain B ranges from 1:30 to 30:1 in terms of the degree of polymerization, said block-graft copolymer having a degree of polymerization of at least 310.

3. The process of claim 1 wherein said block-graft copolymer is comprised of the block chain A of at least one type consisting of recurring units represented by the general formula (I) and having a degree of polymerization of at least 10 and the block chain C of at least one type consisting of recurring units represented by the general formula (III) and having a degree of polymerization of at least 200, wherein the constitutional ratio of block chain A to block chain C ranges from 1:20 to 20:1 in terms of the degree of polymerization, said block-graft copolymer having a degree of polymerization of at least 210.

4. The process of claim 1 wherein the crosslinking reaction is effected by irradiating electron beams.

5. The process of claim 1 wherein said reactive polyalkylene oxide represented by the general formula (IV) is a mixture of a monofunctional polyalkylene oxide and a difunctional polyalkylene oxide.

* * * * *